United States Patent
Okita et al.

(10) Patent No.: US 11,310,657 B2
(45) Date of Patent: Apr. 19, 2022

(54) COMMUNICATION CONTROL DEVICE, COMMUNICATION SETTING METHOD, COMMUNICATION SETTING PROGRAM, AND COMMUNICATION SYSTEM

(71) Applicant: KDDI CORPORATION, Tokyo (JP)

(72) Inventors: Koichi Okita, Tokyo (JP); Shingo Maruyama, Tokyo (JP); Junichi Hashimoto, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/970,673

(22) PCT Filed: Feb. 20, 2019

(86) PCT No.: PCT/JP2019/006272
§ 371 (c)(1),
(2) Date: Aug. 18, 2020

(87) PCT Pub. No.: WO2019/163815
PCT Pub. Date: Aug. 29, 2019

(65) Prior Publication Data
US 2020/0396592 A1      Dec. 17, 2020

(30) Foreign Application Priority Data
Feb. 23, 2018   (JP) .............................. JP2018-030567

(51) Int. Cl.
*H04W 8/18* (2009.01)
*H04W 4/44* (2018.01)
*H04W 4/50* (2018.01)

(52) U.S. Cl.
CPC ............. *H04W 8/183* (2013.01); *H04W 4/44* (2018.02); *H04W 4/50* (2018.02)

(58) Field of Classification Search
CPC ......... H04W 8/183; H04W 4/50; H04W 4/44; H04W 48/18; H04W 4/029; H04W 48/16;
(Continued)

(56) References Cited

U.S. PATENT DOCUMENTS 9,585,000 B2    2/2017   Park
2013/0210388 A1  8/2013  Li et al.
(Continued)

FOREIGN PATENT DOCUMENTS

EP    1 047 253 A2   10/2000
EP    3 264 814 A1    1/2018
(Continued)

OTHER PUBLICATIONS

Office Action issued in corresponding Japanese Application No. 2019-108760 dated Sep. 1, 2020 with English translation.
(Continued)

*Primary Examiner* — Fred A Casca
(74) *Attorney, Agent, or Firm* — Foley & Lardner LLP (57) ABSTRACT

A communication control device according to one embodiment of the present invention includes: a storage unit configured to store conditions for setting a profile used by a communication device for communication; a profile setting unit configured to start to set the profile for the communication device in a case in which a signal received from the communication device satisfies the conditions stored in the storage unit; and a condition setting unit configured to invalidate the conditions stored in the storage unit in a case in which the profile setting unit starts to set the profile and configured to validate conditions for setting a profile used by the communication device for communication in a case in which the profile setting unit has failed in setting the profile.

9 Claims, 6 Drawing Sheets

(58) Field of Classification Search
CPC ..... H04W 64/00; H04W 36/14; H04W 4/025; H04W 72/10; H04W 4/023; H04B 17/318; H04B 1/3822
See application file for complete search history.

(56) References Cited

U.S. PATENT DOCUMENTS

| | | | | |
|---|---|---|---|---|
| 2016/0135040 A1* | 5/2016 | Suzuki | ................. | H04W 8/205 |
| | | | | 455/422.1 |
| 2016/0192312 A1* | 6/2016 | Lambert | ............... | H04W 48/18 |
| | | | | 455/435.2 |
| 2016/0239686 A1* | 8/2016 | Kwon | ................... | G06F 21/606 |
| 2017/0064552 A1 | 3/2017 | Park et al. | | |
| 2019/0176624 A1* | 6/2019 | Powell | ............... | G06K 9/00838 |

FOREIGN PATENT DOCUMENTS

| | | |
|---|---|---|
| JP | 2004-328289 A | 11/2004 |
| JP | 2005-072792 A | 3/2005 |
| JP | 2005-529554 A | 9/2005 |
| JP | 2014-523662 A | 9/2014 |
| JP | 2015-509676 A | 3/2015 |
| JP | 2016-531459 A | 10/2016 |
| JP | 2016-213743 A | 12/2016 |
| WO | WO-2013/119993 A2 | 8/2013 |
| WO | WO-2014/208612 A1 | 12/2014 |
| WO | WO-2016/167536 A1 | 10/2016 |

OTHER PUBLICATIONS

International Search Report issued in corresponding application No. PCT/JP2019/006272 dated May 14, 2019 with English translation.
Office Action issued in corresponding Indian Patent Application No. 202017035090 dated Jul. 1, 2021.
Extended European Search Report issued in corresponding European Application No. 19756823.1 dated Sep. 21, 2021.
Office Action issued in corresponding Japanese Application No. 2021-069736 dated Oct. 5, 2021 with English translation.

* cited by examiner

COMMUNICATION CONTROL DEVICE, COMMUNICATION SETTING METHOD, COMMUNICATION SETTING PROGRAM, AND COMMUNICATION SYSTEM

TECHNICAL FIELD

The present invention relates to a communication control device for controlling communication using a communication device, a communication setting method, a communication setting program, and a communication system.

Priority is claimed on Japanese Patent Application No. 2018-30567, filed Feb. 23, 2018, the content of which is incorporated herein by reference.

BACKGROUND ART

In recent years, because of a communication device designed for use in vehicles, the vehicles capable of performing a communication have been available on the market. There are cases in which vehicles manufactured in a certain country, are transported and sold in another country. In such cases, a profile (a communication profile) is set in a communication device disposed in a vehicle for enabling communication using a communication service provided by a service provider of the country that is a destination of the transportation. A setting process of remotely providing a profile for a communication device and validating the profile is called remote provisioning.

In Patent Documents 1 and 2, technologies for remotely setting a new profile corresponding to a service provider of a movement destination in a terminal when the terminal is moved from a region in which a certain service provider provides a communication service to a region in which another service provider provides a communication service have been described.

PRIOR ART DOCUMENTS

Patent Document

[Patent Document 1] U.S. Pat. No. 9,585,000
[Patent Document 2] U.S. Patent Application Publication No. 2016/0192312

SUMMARY OF THE INVENTION

Problems to be Solved by the Invention

It is known that a time of about several minutes to ten minutes is taken for remotely setting a profile for a communication device. There are cases in which vehicles are powered on at the time of arrival at a country that is a destination of transportation, are powered off again before completion of setting a profile, and are stored at a place at which communication cannot be performed, such as an underground place for a long period.

In the technologies disclosed in Patent Documents 1 and 2, interruption of setting the profile for a long period is not taken into account. In a case in which vehicles are stored for a long period (for example, several months or more), it is inefficient to retry setting the profile described in the technologies disclosed in Patent Documents 1 and 2 over an unlimited number of times. On the other hand, in a case in which retrial of setting the profile is limited to a predetermined number of times, when a vehicle comes into a communicative state after the expiration of a number of retrials, setting the profile cannot be restarted.

The present invention has been realized from such a viewpoint, and an object thereof is to provide a communication control device, a communication setting method, a communication setting program, and a communication system that are capable of restarting setting when a communication device reaches a communicative state in a case in which remote setting of a profile for the communication device has been interrupted for a long period of time.

Means for Solving the Problems

According to a first aspect of the present invention, a communication control device is provided including: a storage unit configured to store conditions for setting a profile used by a communication device for communication; a profile setting unit configured to start to set the profile for the communication device in a case in which a signal received from the communication device satisfies the conditions stored in the storage unit; and a condition setting unit configured to invalidate the conditions stored in the storage unit in a case in which the profile setting unit starts to set the profile and configured to validate conditions for setting a profile used by the communication device for communication in a case in which the profile setting unit has failed in setting the profile.

According to a second aspect of the present invention, a communication control device is provided including: a storage unit configured to store conditions for setting a profile used by a communication device for communication; a profile setting unit configured to start to set the profile for the communication device in a case in which a signal received from the communication device satisfies the conditions stored in the storage unit; and a condition setting unit configured to maintain the conditions stored in the storage unit in a case in which the profile setting unit starts to set the profile and configured to invalidate conditions for setting a profile used by the communication device for communication in a case in which the profile setting unit has succeeded in setting the profile.

The storage unit may store the conditions representing a region corresponding to the profile, and the profile setting unit may start to set the profile using coincidence between a region in which the communication device performs communication that is represented by the signal and the region represented by the conditions as one of conditions.

The profile setting unit may repeat the setting of the profile a predetermined number of times and determine that the setting of the profile has failed in a case in which the setting of the profile is not successful when the predetermined number of times expires.

The profile setting unit may return the number of times of repetition of the setting of the profile to an initial value in a case in which the signal has been received before the predetermined number of times expires.

The profile setting unit sets the profile by validating the profile on the communication device after transmitting the profile to the communication device.

The signal received from the communication device may include information indicating completion of reception of the profile and information indicating completion of validation of the profile.

The profile setting unit may validate the profile without transmitting the profile in a case in which the information indicating the completion of reception of the profile has been received, and the information indicating the completion of validation of the profile has not been received.

According to a third aspect of the present invention, a communication setting method is provided using a processor, the communication setting method including: a step of storing conditions for setting a profile used by a communication device for communication in a storage unit; a step of starting to set the profile for the communication device in a case in which a signal received from the communication device satisfies the conditions stored in the storage unit; and a step of invalidating the conditions stored in the storage unit in a case in which the setting of the profile is started and validating conditions for setting a profile used by the communication device for communication in a case in which the setting of the profile has failed.

According to a fourth aspect of the present invention, a communication setting method is provided using a processor, the communication setting method including: a step of storing conditions for setting a profile used by a communication device for communication in a storage unit; a step of starting to set the profile for the communication device in a case in which a signal received from the communication device satisfies the conditions stored in the storage unit; and a step of maintaining the conditions stored in the storage unit in a case in which the setting of the profile is started and invalidating conditions for setting a profile used by the communication device for communication in a case in which the setting of the profile has been successful.

According to a fifth aspect of the present invention, a communication setting program is provided causing a computer to execute: a step of storing conditions for setting a profile used by a communication device for communication in a storage unit; a step of starting to set the profile for the communication device in a case in which a signal received from the communication device satisfies the conditions stored in the storage unit; and a step of invalidating the conditions stored in the storage unit in a case in which the setting of the profile is started and validating conditions for setting a profile used by the communication device for communication in a case in which the setting of the profile has failed.

According to a sixth aspect of the present invention, a communication setting program is provided causing a computer to execute: a step of storing conditions for setting a profile used by a communication device for communication in a storage unit; a step of starting to set the profile for the communication device in a case in which a signal received from the communication device satisfies the conditions stored in the storage unit; and a step of maintaining the conditions stored in the storage unit in a case in which the setting of the profile is started and invalidating conditions for setting a profile used by the communication device for communication in a case in which the setting of the profile has been successful.

According to a seventh aspect of the present invention, a communication control device is provided including: a storage unit configured to store conditions for setting a profile used by a communication device for communication; and a condition setting unit configured to validate conditions for setting a profile used by the communication device for communication in a case in which the setting of the profile for the communication device, which is started in a case in which a signal received from the communication device satisfies the conditions, has failed.

Advantageous Effects of the Invention

According to the present invention, there is an advantage that setting can be restarted when a communication device reaches a communicative state in a case in which remote setting of a profile for the communication device has been interrupted for a long period.

EMBODIMENTS FOR CARRYING OUT THE INVENTION

First Embodiment

[Overview of Communication System S]

Figure 1:
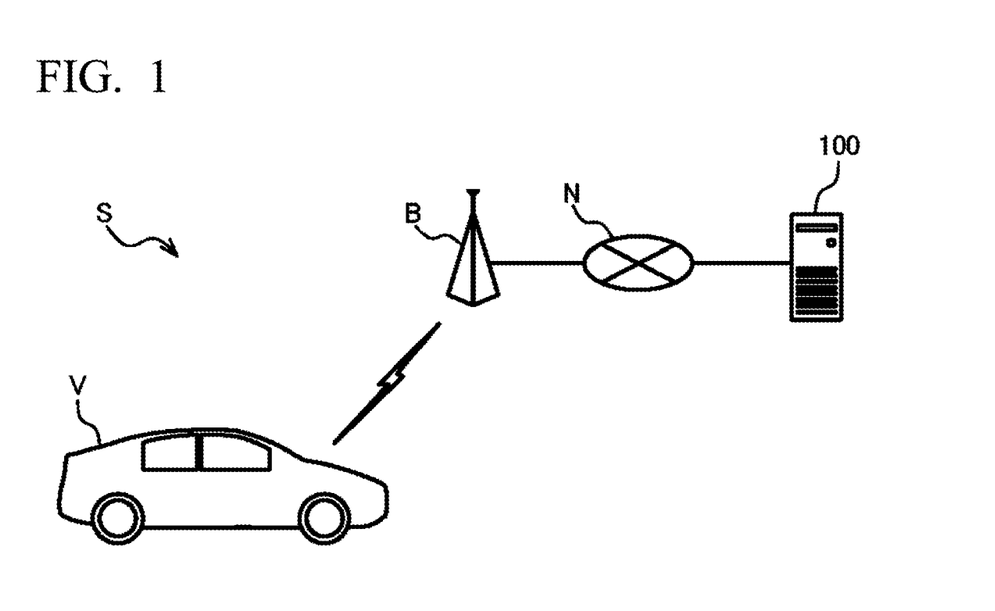
FIG. 1 is a schematic diagram illustrating a communication system according to a first embodiment.

FIG. 1 is a schematic diagram of a communication system S according to this embodiment. The communication system S includes a communication control device 100, a vehicle V, and a base station B. The number of vehicles V and the number of base stations B included in the communication system S are not particularly limited. The communication system S may include other devices such as a server, a terminal, and the like.

The base station B is a radio base station apparatus capable of performing radio communication (mobile communication) such as long term evolution (LTE). The base station B includes facilities such as an antenna, a processor, an electric circuit, and the like that are necessary for radio communication. The base station B is wirelessly connected to communication devices disposed inside a communicable range (that is, a cell) of the base station B. The base station B relays communication between communication devices and a network N such as the Internet.

The vehicle V is a vehicle such as a car, a motorcycle, a self-propelled construction machine, or the like. The vehicle V includes a communication device and is configured to be able to perform radio communication with the network N through the base station B. By communicating with the network N, the vehicle V can receive various information services.

The communication control device 100 is a computer that controls communication of the vehicle V. The communication control device 100 can perform setting of a profile through the network N (in other words, remote provisioning) for the communication device of the vehicle V. The communication control device 100 is connected to the network N in a wired or wireless manner. In FIG. 1, although the communication control device 100 is illustrated as one device, the communication control device may be composed of a plurality of devices.

Figure 2:
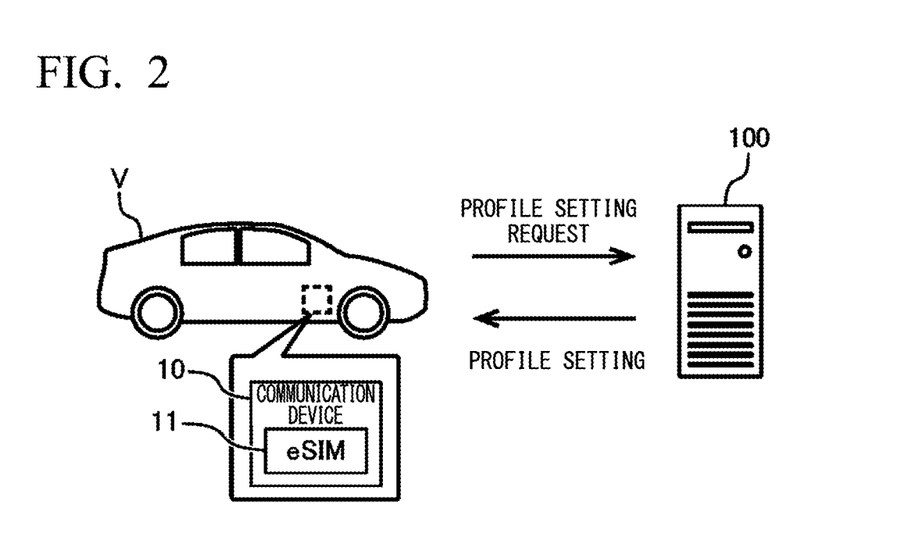
FIG. 2 is a schematic diagram illustrating setting the profile.

FIG. 2 is a schematic diagram illustrating setting the profile performed by a communication control device 100 for a communication device 10 of a vehicle V. The vehicle V includes the communication device 10 used for performing communication. The communication device 10 includes facilities such as an antenna, a processor, an electric circuit, and the like that are necessary for radio communication. In addition, the communication device 10 includes an embedded subscriber identity module (eSIM) 11. The eSIM 11 is a storage medium that stores at least one profile. The eSIM 11 may be fixed to the communication device 10 or may be disposed to be attachable and detachable.

A profile is information (data) that is necessary for performing communication using a communication service provided by a service provider. For example, a profile includes an International Mobile Subscriber Identity (IMSI). The IMSI includes a Mobile Country Code (MCC) that is region identification information used for identifying a region (a country or the like) in which a communication service is provided. The MCC is a three-digit number assigned to each region. The eSIM 11 may have a profile stored therein in advance or may receive a profile from the communication control device 100 through a network N and store the received profile.

In addition, the eSIM 11 stores a validated or invalidated state for each profile stored therein. Each profile stored inside the eSIM 11 is validated or invalidated by the communication control device 100 through the network N (in other words, remotely). The communication device 10 performs communication on the basis of the validated profile inside the eSIM 11. The communication control device 100 validating a profile stored in the eSIM 11 in advance or the communication control device 100 transmitting a profile to the eSIM 11 and validating the profile will be referred to as setting the profile.

When the vehicle V moves from a region in which a certain service provider provides a communication service to a region in which another service provider provides a communication service, the communication device 10 of the vehicle V requests the communication control device 100 to perform setting the profile. When receiving a profile setting request from the communication device 10, the communication control device 100 remotely sets a profile in the communication device 10 (the eSIM 11).

When setting the profile is completed, the communication device 10 can perform communication in a region after moving.

A time of about several minutes to ten minutes is required for remotely setting a profile in the communication device 10. When the vehicle V moves to a place at which communication cannot be performed such as an underground place before completion of setting the profile, setting the profile is interrupted. There are cases in which the vehicle V is stored at a place at which communication cannot be performed for a long period (for example, several months or more). Thus, when setting the profile is retried infinitely, much communication costs and a management costs are wasted. On the other hand, in a case in which the number of retrials of setting the profile is limited, even when the vehicle V comes into a communicative state after the expiration of the number of retrials, setting the profile cannot be resumed.

In contrast thereto, even in a case in which setting the profile has been interrupted for a long period, the communication control device 100 according to this embodiment can resume setting the profile by performing a communication setting method to be described below.

[Configuration of Communication Control Device 100]

Figure 3:
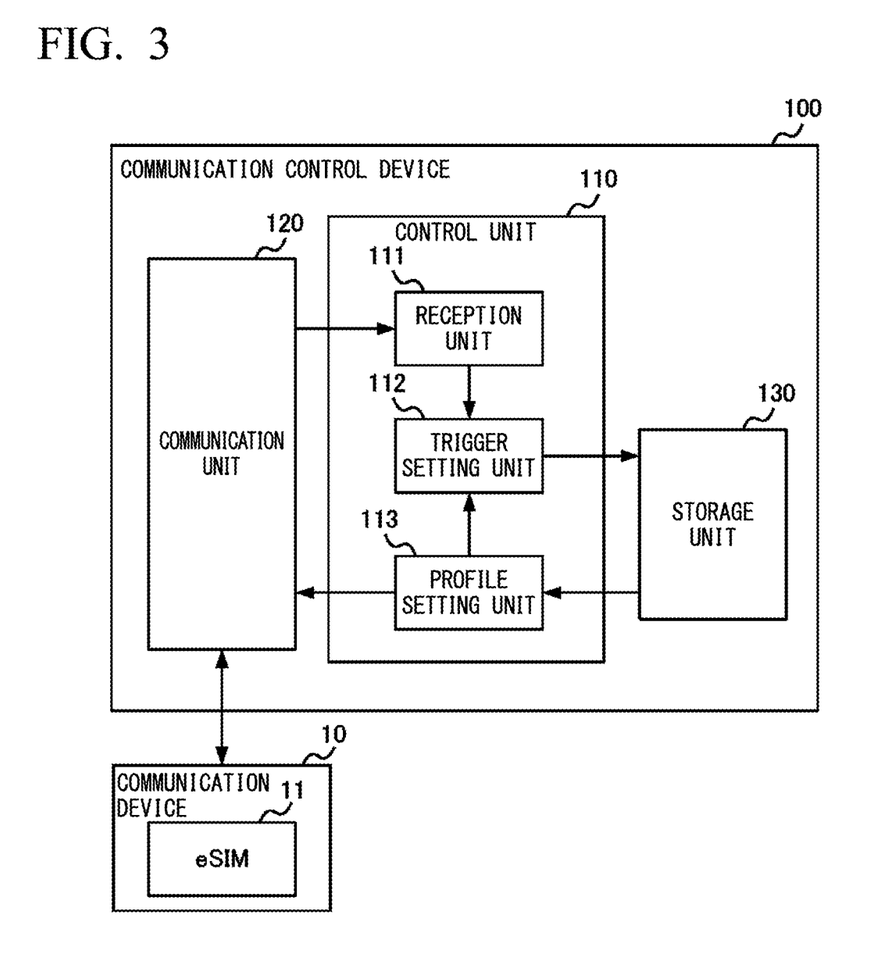
FIG. 3 is a block diagram illustrating a communication control device according to the first embodiment.

FIG. 3 is a block diagram illustrating the communication control device 100 according to this embodiment. In FIG. 3, each arrow indicates a flow of main data, but there may be a flow of data not illustrated in FIG. 3. In FIG. 3, each block represents not a component in units of hardware (devices) but a component in units of functions. For this reason, the blocks illustrated in FIG. 3 may be mounted inside a single device or may be mounted separately inside a plurality of devices. Transmission/reception of data between blocks may be performed through an arbitrary means such as a data bus, a network, a portable storage medium, or the like.

The communication control device 100 includes a control unit 110, a communication unit 120, and a storage unit 130. The control unit 110 includes a reception unit 111, a trigger setting unit 112, and a profile setting unit 113. However, the communication control device 100 according to this embodiment is not limited to the specific configuration illustrated in FIG. 3.

The communication unit 120 is a communication interface that is used for communicating with the communication device 10 of the vehicle V through the base station B. The communication unit 120 includes an antenna, a processor, an electric circuit, and the like used for executing radio communication. The communication unit 120 acquires data by performing a predetermined process on a communication signal received from the outside and inputs the acquired data to the control unit 110. In addition, the communication unit 120 generates a communication signal by performing a predetermined process on data input from the control unit 110 and transmits the generated communication signal to the outside.

The storage unit 130 is a storage medium including a read only memory (ROM), a random access memory (RAM), a hard disk drive, and the like. The storage unit 130 stores a program to be executed by the control unit 110 in advance. In addition, the storage unit 130 stores trigger information representing conditions for performing setting the profile for the communication device 10 and profile information representing a profile to be set in the communication device 10.

The control unit 110, for example, is a processor such as a central processing unit (CPU) or the like. By executing a program stored in the storage unit 130, the control unit 110 functions as the reception unit 111, the trigger setting unit 112, and the profile setting unit 113. The functions of the reception unit 111, the trigger setting unit 112, and the profile setting unit 113 will be described below. At least some of the functions of the control unit 110 may be executed by an electric circuit. In addition, at least some of the functions of the control unit 110 may be executed by a program executed through a network.

[Description of Communication Setting Method]

Figure 4:
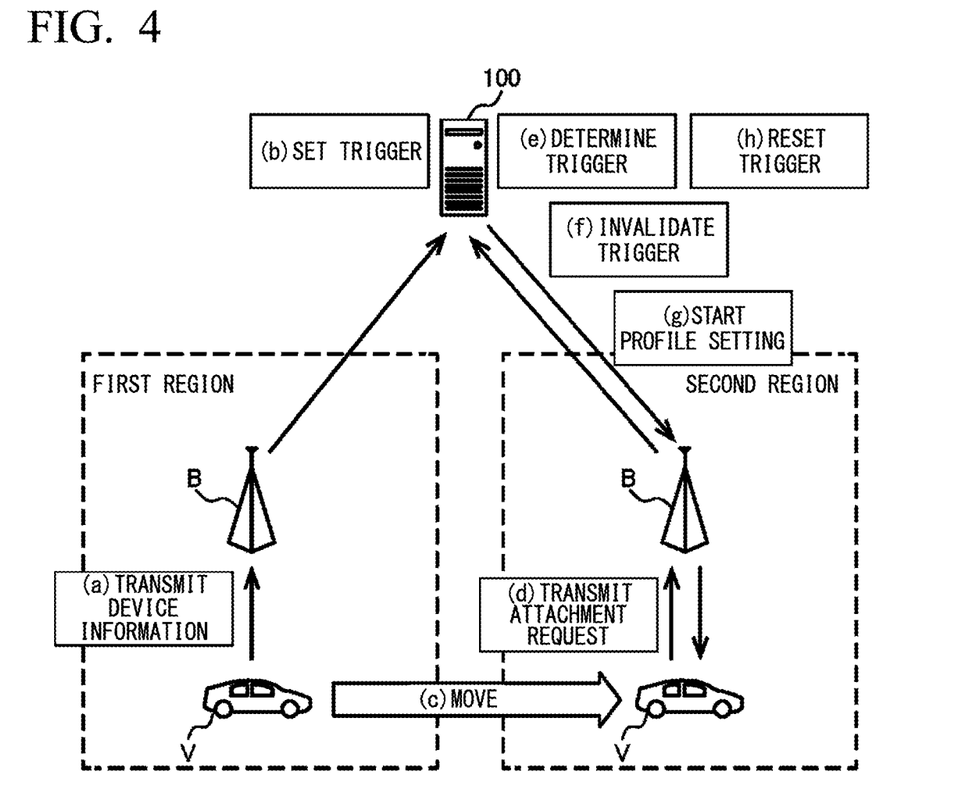
FIG. 4 is a schematic diagram illustrating a communication setting method executed by the communication control device according to the first embodiment.

FIG. 4 is a schematic diagram illustrating a communication setting method executed by the communication control device 100 according to this embodiment. FIG. 4 illustrates a situation in which a vehicle V that is communicable in a first region (for example, a first country) moves to a second region (for example, a second country) other than the first region. In the first region, a profile is set in an eSIM 11 of the vehicle V through remote provisioning or directly (for example, by bringing it into contact with a terminal for setting the profile) in advance.

For example, in the first region, a communication device 10 of the vehicle V transmits device information to the communication control device 100 through a base station B of the first region (in other words, a region before moving) in a state in which the power of the vehicle V is on (a). This device information includes SIM identification information used for identifying the eSIM 11, region identification information of the first region, a communication service provider of the first region, and the like. Thereafter, the power of the vehicle V is turned off. A reception unit 111 of the communication control device 100 receives the device information transmitted from the communication device 10 of the vehicle V.

The trigger setting unit 112 (a condition setting unit) of the communication control device 100 sets a trigger for setting the profile by storing trigger information representing a trigger (a condition) for performing setting the profile in the storage unit 130 on the basis of the device information received from the vehicle V (b).

For example, the trigger information includes SIM identification information used for identifying the eSIM 11 and region identification information (MCC) corresponding to a profile used in a region that is a movement destination (here, the second region). The trigger information may be input to the communication control device 100 by a manager or may be automatically determined in accordance with a predetermined rule on the basis of the device information. In addition, the trigger setting unit 112 associates profile information representing a profile set in a case in which the trigger is satisfied with the trigger information in the storage unit 130.

After the trigger is set by the trigger setting unit 112, the vehicle V moves from the first region to the second region, for example, by being transported by a ship or the like in a state in which the power is off (c). When the power of the vehicle V is turned on (in other words, the vehicle V is energized) in the second region, the communication device 10 of the vehicle V transmits an attachment request to the communication control device 100 through the base station B of the second region (d). The attachment request is a signal used for the communication device 10 to start communication. The attachment request includes SIM identification information used for identifying the eSIM 11 and region identification information (MCC) corresponding to a region (here, the second region) in which communication is to be started. The transmission of the attachment request from the communication device 10 to the base station B of the second region may be performed outside a service region of a contracted service provider (here, a service provider of the first region) in accordance with an affiliation between service providers and may be performed using a service (a roaming service or the like) that enables communication when the communication device is inside a service region of an affiliated service provider (here, a service provider of the second region).

In the communication control device 100, the profile setting unit 113 determines whether or not the attachment request received from the vehicle V satisfies the trigger stored in the storage unit 130 (e). More specifically, in a case in which SIM identification information and region identification information represented by the trigger information stored in the storage unit 130 coincide with SIM identification information and region identification information represented by the attachment request, the profile setting unit 113 determines that the trigger is satisfied. Otherwise, the profile setting unit 113 determines that the trigger is not satisfied. The method of determining a trigger illustrated here is one example, and any other method that can be used for determining a necessity of setting the profile using a trigger based on a region with which the vehicle V communicates may be used.

In a case in which the attachment request does not satisfy the trigger, the profile setting unit 113 does not perform setting the profile, and the trigger setting unit 112 maintains the trigger stored in the storage unit 130. On the other hand, in a case in which the attachment request satisfies the trigger, the trigger setting unit 112 invalidates the trigger stored in the storage unit 130 (f). At this time, the trigger setting unit 112 may invalidate the trigger by setting an invalidation flag to the trigger information stored in the storage unit 130 or may invalidate the trigger by deleting the trigger information stored in the storage unit 130.

After invalidating the trigger, the profile setting unit 113 starts setting the profile (g). The profile setting unit 113 remotely sets a profile in the communication device 10 (the eSIM 11) of the vehicle V. The profile setting unit 113 may validate a profile associated with the trigger after transmitting it to the communication device 10 or may validate the profile stored in the communication device 10 in advance.

Until setting the profile is completed, the profile setting unit 113 repeats setting the profile a predetermined number of times (for example, three times). It is preferable that the profile setting unit 113 should repeat setting the profile during a time in which an idling current flows in the vehicle V after the power of the vehicle V is turned off. In this way, since the communication control device 100 retries setting the profile several times, even in a case in which setting the profile is interrupted due to a temporary cause, setting the profile can be resumed.

In a case in which the communication device 10 transmits an attachment request to the communication control device 100 in accordance with the power of the vehicle V being turned on again while the profile setting unit 113 repeats setting the profile a predetermined number of times, the profile setting unit 113 repeats setting the profile from the start (in other words, by returning the number of times of repetition to an initial value). In accordance with this, the communication control device 100 can retry setting the profile more times, and thus, it becomes easy to succeed in setting the profile.

In a case in which setting the profile has not been completed (in other words, setting the profile fails) even when the number of times of repetition expires, the profile setting unit 113 interrupts setting the profile, and the trigger setting unit 112 resets (validates) the trigger in the storage unit 130 (h). The trigger setting unit 112 may validate a trigger by deleting the invalidation flag set to the trigger information in the storage unit 130 and may validate a trigger by storing trigger information in the storage unit 130 again. In a case in which an attachment request is transmitted from the vehicle V after the trigger setting unit 112 resets the trigger, the profile setting unit 113 starts setting the profile again for the trigger that has been reset. In this way, the communication control device 100 enables setting the profile to be resumed only by validating the trigger again in a case in which setting the profile has failed, and thus the state of the trigger does not need to be managed for each communication device 10 of the vehicle V.

When setting the profile is completed (in other words, setting the profile is successful), the communication device 10 of the vehicle V transmits completion information indicating the completion to the communication control device 100. For example, the communication device 10 transmits completion information using a short message service (SMS). In a case in which the reception unit 111 receives completion information from the vehicle V, the communication control device 100 ends the communication setting method. The communication device 10 may transmit completion information to the communication control device 100 at each of a timing at which reception of a profile from the communication control device 100 has been completed and a timing at which validation of the profile has been completed in setting the profile.

In a case in which completion information of the completion of reception of the profile has been received, and completion information of the completion of validation of the profile has not been received, the profile setting unit 113 of the communication control device 100 may validate the profile without transmitting the profile. In accordance with this, for example, in a case in which only the reception of the profile has been completed in the communication device 10 during repetition of setting the profile, the communication control device 100 can resume the process starting from the validation of the profile, which is efficient.

In this way, the communication control device 100 according to this embodiment invalidates a trigger (condition) for setting the profile at the time of starting setting the profile and validates the trigger again in a case in which setting the profile has failed, and thus, setting the profile can be resumed when the communication device 10 comes into a communicative state any number of times.

[One Example of Communication Sequence of Communication Setting Method]

Figure 5:
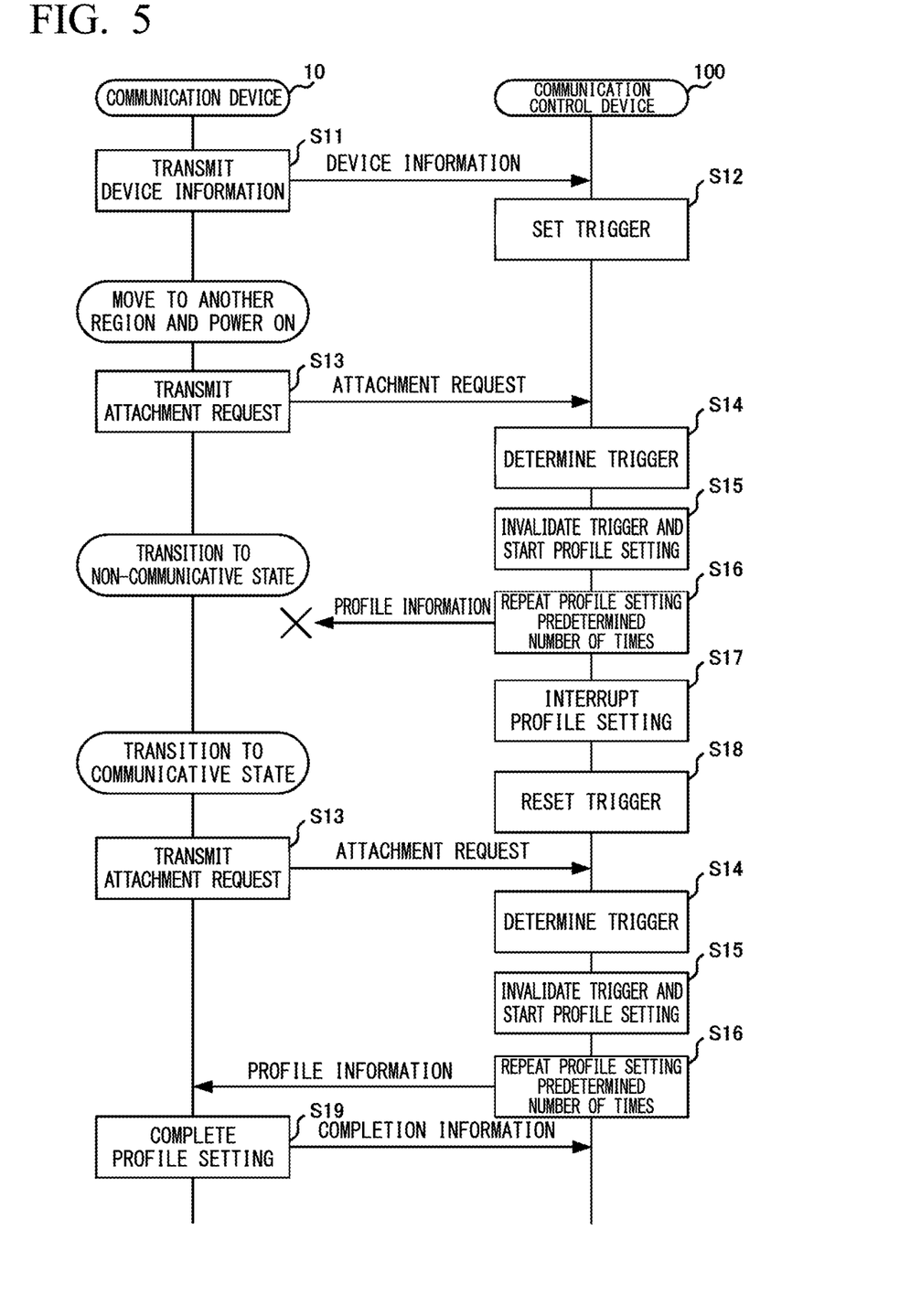
FIG. 5 is a sequence diagram illustrating a communication setting method executed by the communication control device according to the first embodiment.

FIG. 5 is a diagram illustrating a communication sequence of a communication setting method executed by the communication control device 100 according to this embodiment. First, the communication device 10 transmits device information to the communication control device 100 (S11). This device information includes SIM identification information used for identifying the eSIM 11, region identification information of a region before moving, a communication service provider of the region before moving, and the like. The reception unit 111 of the communication control device 100 receives the device information from the vehicle V.

The trigger setting unit 112 of the communication control device 100 stores trigger information representing a trigger (condition) used for performing setting the profile in the storage unit 130 on the basis of the device information received from the vehicle V by the reception unit 111, thereby setting a trigger for setting the profile (S12).

After the trigger is set, the vehicle V moves to another region, and the power is turned on. At this time, the communication device 10 of the vehicle V transmits an attachment request to the communication control device 100 (S13). This attachment request includes SIM identification information used for identifying the eSIM 11 and region identification information of a region that is a movement destination. The reception unit 111 of the communication control device 100 receives the attachment request from the vehicle V.

In the communication control device 100, the profile setting unit 113 determines whether or not the attachment request received from the vehicle V by the reception unit 111 satisfies the trigger stored in the storage unit 130 (S14). In a case in which the attachment request satisfies the trigger, the trigger setting unit 112 invalidates the trigger stored in the storage unit 130, and the profile setting unit 113 starts setting the profile (S15).

The profile setting unit 113 repeats setting the profile a predetermined number of times until setting the profile is completed (S16). In the example illustrated in FIG. 5, since the vehicle V transitions to a state in which the vehicle V is not communicable after the start of setting the profile, it is assumed that setting the profile is not completed even after setting the profile has been repeated a predetermined number of times. At this time, the profile setting unit 113 interrupts setting the profile (S17). Then, the trigger setting unit 112 resets (validates) the trigger in the storage unit 130 (S18).

In a case in which the vehicle V transitions to a communicative state after the trigger has been reset, the communication device 10 and the communication control device 100 perform Steps S13 to S16 again for the reset trigger. When setting the profile is completed, the communication device 10 transmits completion information indicating completion to the communication control device 100 (S19), and the communication control device 100 ends the communication setting method.

Effect of this Embodiment

The communication control device 100 according to this embodiment invalidates the trigger (condition) of setting the profile at the time of starting setting the profile and validates the trigger again in a case in which setting the profile has failed. In this way, even in a case in which setting the profile for the communication device 10 of the vehicle V has been interrupted for a long period, the communication control device 100 can resume setting the profile when the communication device 10 comes into a communicative state any number of times. In addition, since the trigger is invalidated at the time of starting setting the profile, the communication control device 100 does not need to perpetually manage a trigger relating to a vehicle of which setting the profile has not been completed until setting the profile is completed.

Second Embodiment

While the communication control device 100 according to the first embodiment invalidates a trigger for setting the profile at the time of starting setting the profile, a communication control device 100 invalidates the trigger for setting the profile when setting the profile is completed. Also in this embodiment, the communication control device 100 can resume setting the profile even in a case in which setting the profile has been interrupted for a long period.

Figure 6:
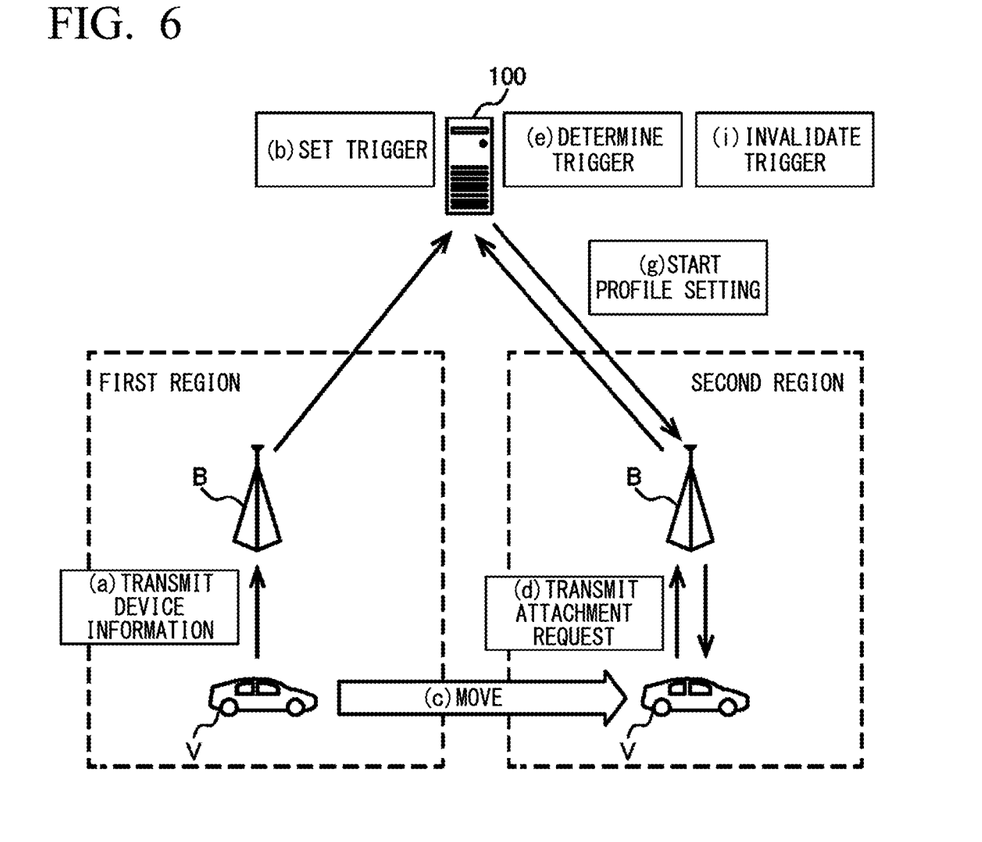
FIG. 6 is a schematic diagram illustrating a communication setting method executed by a communication control device according to a second embodiment.

FIG. 6 is a schematic diagram of a communication setting method executed by the communication control device 100 according to this embodiment. In this embodiment, when compared with the communication setting method illustrated in FIG. 4, the invalidation of a trigger at the time of starting setting the profile (f) and resetting of the trigger when setting the profile fails (h) are omitted, and, instead, invalidation of the trigger at the time of completion of setting the profile (i) is added. The other configurations and the other processes of the communication control device 100 are similar to those according to the first embodiment.

More specifically, first, the communication device 10 of the vehicle V and the communication control device 100 perform processes (a) to (e) similar to those illustrated in FIG. 4. In a case in which an attachment request satisfies a trigger, the trigger setting unit 112 maintains the trigger stored in the storage unit 130 without invalidating it, and the profile setting unit 113 starts setting the profile (g). Until setting the profile is completed, the profile setting unit 113 repeats setting the profile a predetermined number of times.

In a case in which setting the profile has not been completed (in other words, setting the profile has failed) even after the number of times of repetition expires, the profile setting unit 113 interrupts setting the profile. At this time, since the trigger stored in the storage unit 130 is not invalidated, the trigger setting unit 112 does not reset the trigger. Thereafter, in a case in which an attachment request is transmitted from the vehicle V again, the profile setting unit 113 starts setting the profile again for the trigger maintained in the storage unit 130.

In a case in which setting the profile has been completed (in other words, setting the profile is successful) within the predetermined number of times, the trigger setting unit 112 invalidates the trigger stored in the storage unit 130 (*i*). The trigger setting unit 112 sets an invalidation flag to the trigger information stored in the storage unit 130, thereby invalidating the trigger. The trigger setting unit 112 may invalidate the trigger by deleting the trigger information stored in the storage unit 130.

[One Example of Communication Sequence of Communication Setting Method]

Figure 7:
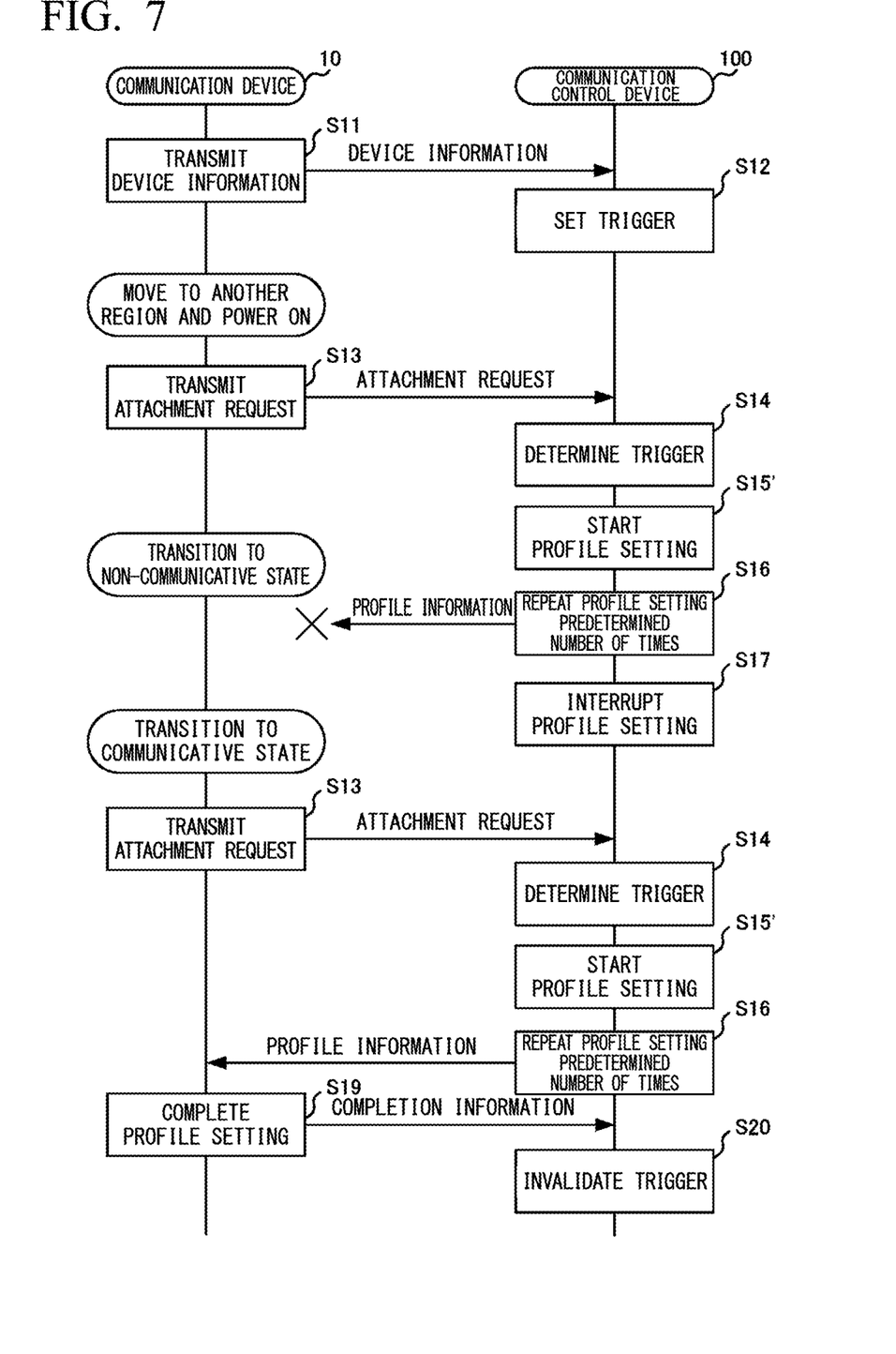
FIG. 7 is a sequence diagram illustrating a communication setting method executed by the communication control device according to the second embodiment.

FIG. 7 is a diagram illustrating a communication sequence of a communication setting method executed by the communication control device 100 according to this embodiment.

First, the communication device 10 transmits device information to the communication control device 100 (S11). This device information includes SIM identification information used for identifying the eSIM 11, region identification information of a region before moving, a communication service provider of the region before moving, and the like. The reception unit 111 of the communication control device 100 receives the device information from the vehicle V.

The trigger setting unit 112 of the communication control device 100 stores trigger information representing a trigger (condition) used for performing setting the profile in the storage unit 130 on the basis of the device information received from the vehicle V by the reception unit 111, thereby setting a trigger for setting the profile (S12).

After the trigger is set, the vehicle V moves to another region, and the power is turned on. At this time, the communication device 10 of the vehicle V transmits an attachment request to the communication control device 100 (S13). This attachment request includes SIM identification information used for identifying the eSIM 11 and region identification information of a region that is a movement destination. The reception unit 111 of the communication control device 100 receives the attachment request from the vehicle V.

In the communication control device 100, the profile setting unit 113 determines whether or not the attachment request received from the vehicle V by the reception unit 111 satisfies the trigger stored in the storage unit 130 (S14). In a case in which the attachment request satisfies the trigger, the trigger setting unit 112 maintains the trigger stored in the storage unit 130, and the profile setting unit 113 starts setting the profile (S15').

The profile setting unit 113 repeats setting the profile a predetermined number of times until setting the profile is completed (S16). In the example illustrated in FIG. 7, since the vehicle V transitions to a state in which the vehicle V is not communicable after the start of setting the profile, it is assumed that setting the profile is not completed even after setting the profile has been repeated a predetermined number of times. At this time, the profile setting unit 113 interrupts setting the profile (S17). The trigger setting unit 112 does not reset the trigger.

In a case in which the vehicle V transitions to a communicative state after the trigger has been reset, the communication device 10 and the communication control device 100 perform Steps S13 to S16 again for the reset trigger.

When setting the profile is completed, the communication device 10 transmits completion information indicating completion to the communication control device 100 (S19). When the reception unit 111 of the communication control device 100 receives the completion information from the communication device 10, the trigger setting unit 112 invalidates the trigger stored in the storage unit 130 (S20).

Effect of this Embodiment

In this way, the communication control device 100 according to this embodiment maintains the trigger (condition) of setting the profile at the time of starting setting the profile and invalidates the trigger in a case in which setting the profile has been completed. In this way, even in a case in which setting the profile for the communication device 10 of the vehicle V has been interrupted for a long period, the communication control device 100 can resume setting the profile when the communication device 10 comes into a communicative state any number of times. In addition, each of the process of setting a trigger and the process of invalidating the trigger required for setting the profile performed once is performed once. For this reason, a load applied to the communication control device 100 according to setting the profile (remote provisioning) can be reduced.

In each of the embodiments described above, although description has been presented using the communication device 10 mounted in the vehicle V, an application destination of the communication control device 100 is not limited thereto. For example, the communication control device 100 can be applied also to communication setting for a communication device mounted in a ship, an IoT device, and the like. Particularly, since there is a limit on the capacity of a battery, frequently, a time during which the power is turned on is short at the time of moving or storing the vehicle V. The communication control device 100 according to each of the embodiments described above can resume setting the profile even in a case in which setting the profile has been interrupted for a long period and thus can be appropriately used for communication setting for the communication device 10 of the vehicle V.

As above, although the present invention has been described using the embodiments, the technical scope of the present invention is not limited to a range of description of the embodiments described above, and various modifications and changes can be made within the range of the gist thereof. For example, a specific embodiment of distribution/integration of devices is not limited to the embodiments described above, and all or some thereof can be configured by distributing or integrating them functionally or physically in an arbitrary unit. In addition, a new embodiment generated by arbitrarily combining a plurality of embodiments is included in an embodiment of the present invention. Effects of a new embodiment generated through combination also have the effects of the original embodiments.

Processors of the communication device 10 and the communication control device 100 become subjects of steps (processes) included in the communication setting methods illustrated in FIGS. 5 and 7. In other words, the processors of the communication device 10 and the communication control device 100 read programs used for executing the communication setting methods illustrated in FIGS. 5 and 7 from a storage unit, execute the programs, and control each unit of the communication device 10 and the communication control device 100, thereby executing the communication setting methods illustrated in FIGS. 5 and 7. Some of the steps included in the communication setting methods illustrated in FIGS. 5 and 7 may be omitted, the sequence of the steps may be changed, and a plurality of steps may be performed in a parallel manner.

REFERENCE SIGNS LIST

S Communication system
10 Communication device
100 Communication control device
110 Control unit
111 Reception unit
112 Trigger setting unit
113 Profile setting unit
130 Storage unit

The invention claimed is:

1. A communication control device comprising:
one or more processors; and
one or more storage media having computer program instructions stored thereon, wherein the computer program instructions, when executed by the one or more processors, perform processing of:
storing conditions in the one or more storage media as a trigger for setting in a communication device a profile used by the communication device for communication;
starting to set the profile in the communication device in a case in which a signal received from the communication device satisfies the conditions stored in the one or more storage media;
deleting the conditions stored in the one or more storage media in a case in which the one or more processors start to set the profile in the communication device and resetting the conditions stored in the one or more storage media in a case in which the one or more processors have not completed setting the profile in the communication device;
repeating the setting of the profile a predetermined number of times and determines that the setting of the profile has not been completed in a case in which the setting of the profile is not successful even when the predetermined number of times expires; and
returning the number of times of repetition of the setting of the profile to an initial value in a case in which the signal has been received before the predetermined number of times expires.

2. The communication control device according to claim 1,
wherein the one or more storage media store the conditions representing a region corresponding to the profile, and
wherein the one or more processors start to set the profile using coincidence between a region in which the communication device performs communication that is represented by the signal and a region represented by the conditions as one of conditions.

3. The communication control device according to claim 1,
wherein the one or more processors set the profile by validating the profile on the communication device after transmitting the profile to the communication device, and
wherein the signal received from the communication device includes information indicating completion of reception of the profile and information indicating completion of validation of the profile.

4. The communication control device according to claim 3, wherein the one or more processors validate the profile without transmitting the profile in a case in which the information indicating the completion of reception of the profile has been received, and the information indicating the completion of validation of the profile has not been received.

5. A communication control device comprising:
one or more processors; and
one or more storage media having computer program instructions stored thereon, wherein the computer program instructions, when executed by the one or more processors, perform processing of:
storing conditions in the one or more storage media as a trigger for setting in a communication device a profile used by the communication device for communication;
starting to set the profile in the communication device in a case in which a signal received from the communication device satisfies the conditions stored in the one or more storage media;
maintaining the conditions stored in the one or more storage media in a case in which the one or more processors start to set the profile in the communication device, deleting the conditions stored in the one or more storage media in a case in which the one or more processors have completed setting the profile in the communication device, and resetting the conditions stored in the one or more storage media in a case in which the one or more processors have not completed setting the profile in the communication device;
repeating the setting of the profile a predetermined number of times and determines that the setting of the profile has not been completed in a case in which the setting of the profile is not successful even when the predetermined number of times expires; and
returning the number of times of repetition of the setting of the profile to an initial value in a case in which the signal has been received before the predetermined number of times expires.

6. The communication control device according to claim 5,
wherein the one or more storage media store the conditions representing a region corresponding to the profile, and
wherein the one or more processors start to set the profile using coincidence between a region in which the communication device performs communication that is represented by the signal and a region represented by the conditions as one of conditions.

7. The communication control device according to claim 5,
wherein the one or more processors set the profile by validating the profile on the communication device after transmitting the profile to the communication device, and
wherein the signal received from the communication device includes information indicating completion of reception of the profile and information indicating completion of validation of the profile.

8. The communication control device according to claim 7, wherein the one or more processors validate the profile without transmitting the profile in a case in which the information indicating the completion of reception of the profile has been received, and the information indicating the completion of validation of the profile has not been received.

9. A communication setting method using a processor, the communication setting method comprising:
storing conditions as a trigger for setting a profile used by a communication device for communication in a storage medium;

starting to set the profile for the communication device in a case in which a signal received from the communication device satisfies the conditions stored in the storage medium;

deleting the conditions stored in the storage medium in a case in which the setting of the profile is started and resetting the conditions stored in the storage medium in a case in which the setting of the profile has not completed in the communication device;

repeating the setting of the profile a predetermined number of times and determines that the setting of the profile has not been completed in a case in which the setting of the profile is not successful even when the predetermined number of times expires; and returning the number of times of repetition of the setting of the profile to an initial value in a case in which the signal has been received before the predetermined number of times expires.

\* \* \* \* \*